United States Patent
Seki et al.

(10) Patent No.: US 9,863,614 B2
(45) Date of Patent: Jan. 9, 2018

(54) BEAM-CONTROL MEMBER AND ILLUMINATION DEVICE

(71) Applicant: Enplas Corporation, Saitama (JP)

(72) Inventors: Akinobu Seki, Saitama (JP); Noriyuki Kawahara, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 659 days.

(21) Appl. No.: 14/375,451

(22) PCT Filed: Jan. 28, 2013

(86) PCT No.: PCT/JP2013/000421
§ 371 (c)(1),
(2) Date: Jul. 30, 2014

(87) PCT Pub. No.: WO2013/118448
PCT Pub. Date: Aug. 15, 2013

(65) Prior Publication Data
US 2015/0009679 A1    Jan. 8, 2015

(30) Foreign Application Priority Data

Feb. 10, 2012  (JP) .................................. 2012-026971
Aug. 30, 2012  (JP) .................................. 2012-190014

(51) Int. Cl.
*F21V 3/00*        (2015.01)
*F21V 5/00*        (2015.01)
(Continued)

(52) U.S. Cl.
CPC ................ *F21V 17/18* (2013.01); *F21K 9/60* (2016.08); *F21V 5/008* (2013.01); *F21V 5/04* (2013.01);
(Continued)

(58) Field of Classification Search
CPC ... F21K 9/20; F21K 9/60; F21V 13/04; F21V 13/12; F21V 17/14; F21V 17/164;
(Continued)

(56) References Cited

U.S. PATENT DOCUMENTS 6,932,496 B2 *  8/2005  Rizkin .................... B64F 1/205
                                                      362/183
7,473,007 B1 *  1/2009  Wang ..................... F21L 4/027
                                                      362/187
(Continued)

FOREIGN PATENT DOCUMENTS

JP    2003-178612 A    6/2003
JP    2003-258319 A    9/2003
(Continued)

OTHER PUBLICATIONS

Extended European Search Report for EP 13747304.7 dated Aug. 28, 2015.

*Primary Examiner* — Tsion Tumebo
(74) *Attorney, Agent, or Firm* — Brundidge & Stanger, P.C.

(57) ABSTRACT

A beam-control member has a substantially cylindrical holder that is light-permeable, and a first beam-control member disposed on an end surface of the holder, the first beam-control member reflecting part of the light emitted from a light-emitting element and admitting part of the light. A guide protrusion and a tab are provided on the end surface of the holder. A concave portion corresponding to the tab is provided on an outer circumferential part of one surface of the first beam-control member. The first beam-control member is radially mated in a rotatable manner along the guide protrusion. Rotating the first beam-control member on the end surface of the holder so that the tab and the concave
(Continued)

portion engage causes the first beam-control member to be secured on the end surface of the holder.

20 Claims, 18 Drawing Sheets

(51) Int. Cl.

| | | |
|---|---|---|
| *F21V 17/18* | (2006.01) | |
| *F21V 5/04* | (2006.01) | |
| *G02B 7/02* | (2006.01) | |
| *G02B 19/00* | (2006.01) | |
| *F21V 17/14* | (2006.01) | |
| *F21V 17/16* | (2006.01) | |
| *F21V 13/04* | (2006.01) | |
| *F21K 9/60* | (2016.01) | |
| *G02B 3/08* | (2006.01) | |
| *F21V 7/04* | (2006.01) | |
| *F21V 7/22* | (2006.01) | |
| *F21V 13/12* | (2006.01) | |
| *F21K 9/20* | (2016.01) | |
| *F21Y 115/10* | (2016.01) | |

(52) U.S. Cl.
CPC .............. *F21V 13/04* (2013.01); *F21V 17/14* (2013.01); *F21V 17/164* (2013.01); *G02B 7/022* (2013.01); *G02B 19/0061* (2013.01); F21K 9/20 (2016.08); F21V 5/045 (2013.01); F21V 7/041 (2013.01); F21V 7/22 (2013.01); F21V 13/12 (2013.01); F21Y 2115/10 (2016.08); G02B 3/08 (2013.01)

(58) Field of Classification Search
CPC . F21V 17/18; F21V 5/008; F21V 5/04; F21V 5/045; F21V 7/041; F21V 7/22; F21V 3/02; G02B 7/022

USPC .................. 362/268, 296.01–310, 328, 343
See application file for complete search history.

(56) References Cited

U.S. PATENT DOCUMENTS

| | | | |
|---|---|---|---|
| 7,488,097 B2 * | 2/2009 | Reisenauer ............... | F21K 9/20 362/294 |
| 2003/0063474 A1 | 4/2003 | Coushaine | |
| 2003/0185005 A1 * | 10/2003 | Sommers ................ | F21V 7/041 362/240 |
| 2004/0057252 A1 | 3/2004 | Coushaine | |
| 2008/0080192 A1 * | 4/2008 | Ruud ...................... | F21S 8/083 362/335 |
| 2010/0091499 A1 * | 4/2010 | Jiang ........................ | F21V 5/04 362/268 |
| 2010/0284194 A1 * | 11/2010 | Miyashita ................. | F21V 5/04 362/311.09 |
| 2010/0328960 A1 | 12/2010 | Wang | |
| 2012/0120667 A1 * | 5/2012 | Schenkl ................ | D06F 37/266 362/335 |
| 2013/0058103 A1 * | 3/2013 | Jiang ........................ | F21V 5/04 362/296.05 |
| 2013/0128576 A1 | 5/2013 | Seki et al. | |

FOREIGN PATENT DOCUMENTS

| | | | | |
|---|---|---|---|---|
| JP | 2003-347601 A | 12/2003 | | |
| JP | 2011-124034 A | 6/2011 | | |
| WO | WO 2008110796 A1 * | 9/2008 | .......... | B60Q 1/2611 |
| WO | 2012/017636 A1 | 2/2012 | | |

* cited by examiner

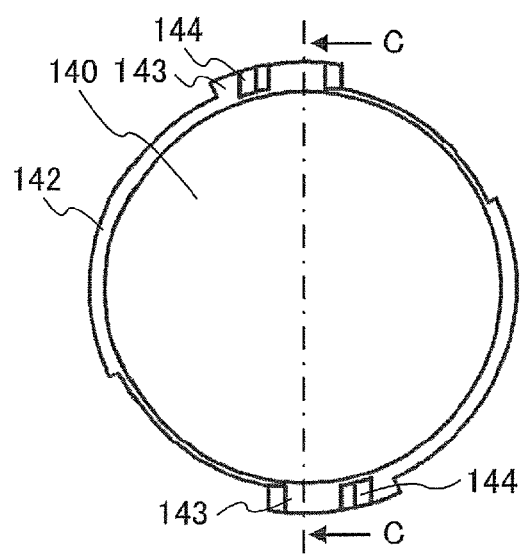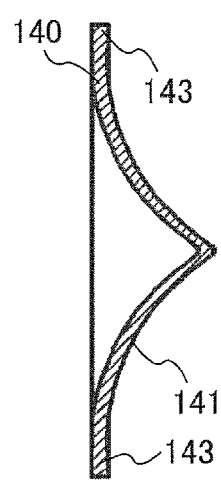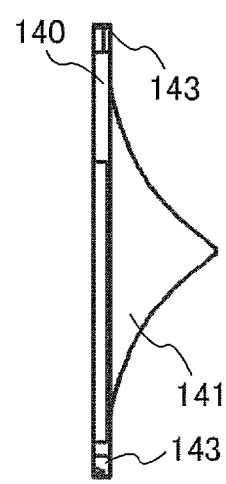
FIG. 8A  FIG. 8D  FIG. 8E
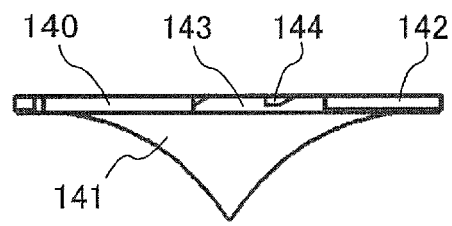
FIG. 8B
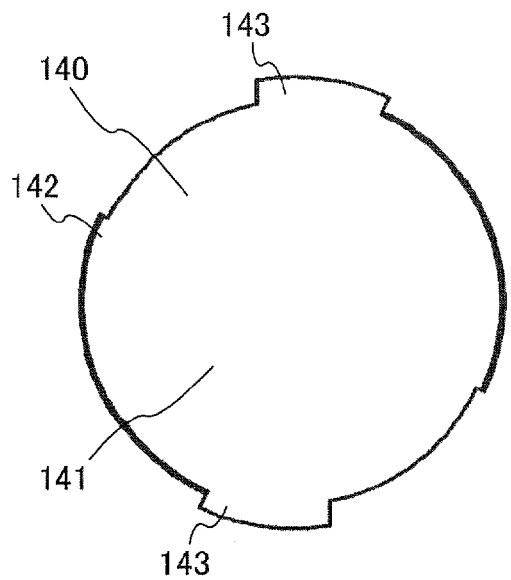
FIG. 8C

BEAM-CONTROL MEMBER AND ILLUMINATION DEVICE

TECHNICAL FIELD

The present invention relates to a light flux controlling member that controls the light distribution of light emitted from a light emitting element, and an illumination apparatus that includes the light flux controlling member.

BACKGROUND ART

Recently, from the viewpoint of energy saving and environment protection, illumination apparatuses (for example, LED light bulbs) that use a light-emitting diode (hereinafter, also referred to as "LED") as a light source are used as an alternative to incandescent light bulbs.

However, a conventional illumination apparatus that uses an LED as a light source emits light only in the forward direction, and cannot emit light in a wide direction like an incandescent light bulb. Therefore, unlike an incandescent light bulb, the conventional illumination apparatus cannot illuminate the inside of a room extensively using reflected light from a ceiling or wall surfaces.

In order to make the light distribution characteristics of such a conventional illumination apparatus that uses an LED as a light source close to the light distribution characteristics of an incandescent light bulb, technology has been proposed that controls the traveling direction of light emitted from the LED by the use of a light flux controlling member (for example, see PTL 1).

FIG. 1 is a cross-sectional view illustrating the configuration of illumination apparatus 10 described in PTL 1. As shown in FIG. 1, illumination apparatus 10 includes a plurality of LEDs 12 arranged on a substrate, and case 14 made of an optically transparent material and disposed so as to cover the LEDs 12. Case 14 is constituted by case body 14a in a cylindrical shape and cover section 14b formed in an inverted circular truncated cone shape. Case body 14a and cover section 14b are integrally formed in a single unit. A transflective film (half-mirror coating) 16 is formed on the inner face of cover section 14b. As indicated by arrows in FIG. 1, part of the light emitted from LEDs 12 passes through transflective film 16 and serves as light emitted in the forward direction (upward direction). Further, part of the light emitted from LEDs 12 is reflected by transflective film 16 and serves as light emitted in the lateral direction (horizontal direction) and in the backward direction (downward direction).

By controlling the traveling direction of light emitted from the LEDs using a light flux controlling member (case 14 in which semi-transflective film 16 is formed) having both optical transparency and optical reflectivity, in the manner described above, emitted light can be obtained not only in the forward direction, but also in the lateral direction and in the backward direction. Therefore, by using the light flux controlling member described in PTL 1, the light distribution characteristics of the illumination apparatus (LED light bulb) can be made close to the light distribution characteristics of an incandescent light bulb to a certain extent.

CITATION LIST

Patent Literature

PTL 1
Japanese Patent Application Laid-Open No. 2003-258319

SUMMARY OF INVENTION

Technical Problem

In the light flux controlling member described in PTL 1, cover section 14b that has both optical transparency and optical reflectivity and case body 14a that has optical transparency require different optical properties from each other. Consequently, it is necessary to separately adjust the respective optical properties of cover section 14b and case body 14a. However, since cover section 14b and case body 14a are integrated in the light flux controlling member described in PTL 1, separately adjusting the respective optical properties is a complicated process, and the manufacturing cost increases.

As one means for solving the above described problem, it is conceivable to separately manufacture cover section 14b (transflective member) that has both optical transparency and optical reflectivity and case body 14a (holder) that has optical transparency. In such a case, it is necessary to fix cover section 14b to one end of case body 14a.

A method that fixes cover section 14b using an adhesive is conceivable as a method for fixing cover section 14b to one end of case body 14a. However, according to this method, since a step of applying adhesive must be added to the manufacturing process, there is a problem of an increased cost of manufacturing the light flux controlling member.

Another conceivable method for fixing cover section 14b to one end of case body 14a is a method in which, as shown in FIG. 2, a plurality of hooks 18 for holding cover section 14b from the side are provided on case body 14a. In this case, it is necessary to form notch portions 20 around each hook 18 to provide each hook 18 with elasticity. However, according to this method, since light leaks from notch portions 20, a desired light distribution cannot be realized.

An object of the present invention is to provide a light flux controlling member that is constituted by a plurality of members and that is superior in terms of both optical properties and manufacturability. Another object of the present invention is to provide an illumination apparatus that includes the light flux controlling member.

Solution to Problem

To achieve at least one of the above mentioned objects, a light flux controlling member according to one aspect of the present invention controls a light distribution of light emitted from a light emitting element, the light flux controlling member including: a substantially cylindrically shaped holder having optical transparency, and a first light flux controlling member disposed on one end face of the holder, the first light flux controlling member reflecting part of the light emitted from the light emitting element and transmitting part of the light emitted from the light emitting element; wherein: the first light flux controlling member includes two principal surfaces that are in a front-and-rear relationship; a guide protrusion is provided at one part of an outer peripheral portion of the one end face of the holder; one or more hooks are provided on the one end face of the holder; a fitting portion that is located between the hook and the one end face of the holder when the first light flux controlling member is mounted on the one end face is provided at an outer peripheral portion of the first light flux controlling member; movement of the first light flux controlling member in a radial direction is restricted by allowing the first light flux controlling member to be radially fitted so as to be rotatable along the guide protrusion; and the first light flux controlling member is fixed on the one end face of the holder by rotating the first light flux controlling member on the one end face of the holder to engage the fitting portion between the hook and the one end face.

An illumination apparatus according to another aspect of the present invention includes: one or more light emitting elements; the light flux controlling member of the present invention; and a cover that transmits reflected light and transmitted light from the light flux controlling member while diffusing the reflected light and the transmitted light.

Advantageous Effects of Invention

According to the present invention a light flux controlling member can be provided that is constituted by a plurality of members and that is superior in terms of both optical properties and manufacturability.

BRIEF DESCRIPTION OF DRAWINGS

FIG. 8A is a plan view of a first light flux controlling member, FIG. 8B is a front view of the first light flux controlling member, FIG. 8C is a bottom view of the first light flux controlling member, FIG. 8D is a cross-sectional view taken along line C-C shown in FIG. 8A, and FIG. 8E is a right side view of the first light flux controlling member;

DESCRIPTION OF EMBODIMENTS

Embodiments of the present invention will be described in detail hereinafter with reference to the accompanying drawings.

Embodiment 1

[Configuration of Illumination Apparatus]

Figure 3:
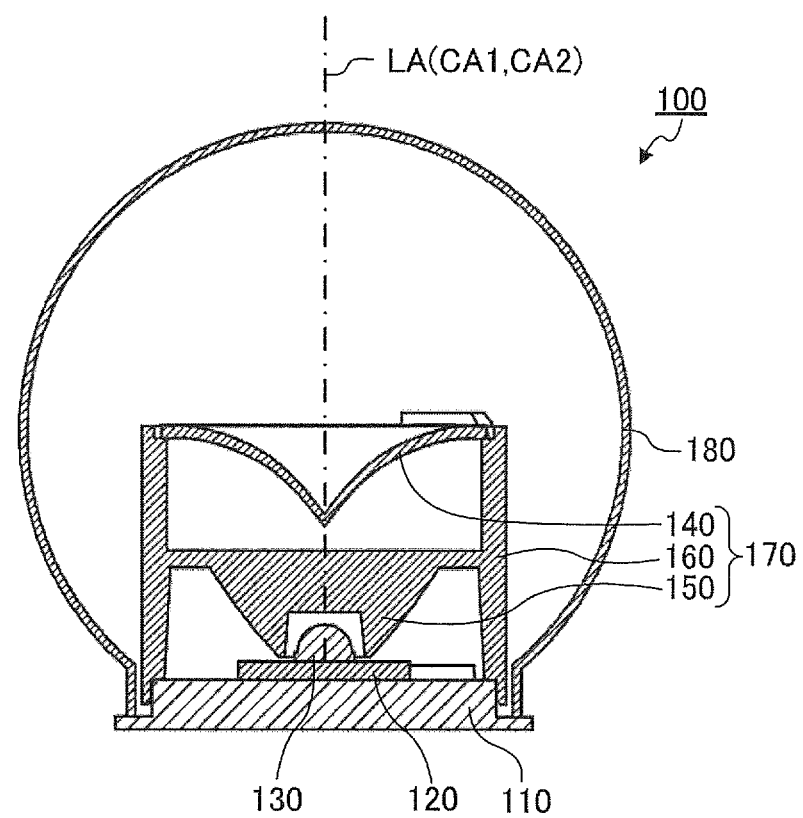
FIG. 3 is a cross-sectional view of an illumination apparatus according to Embodiment 1.

FIG. 3 is a cross-sectional view of illumination apparatus 100 according to Embodiment 1 of the present invention. The illumination apparatus according to the present embodiment can be used as an alternative to an incandescent light bulb.

As shown in FIG. 3, illumination apparatus 100 includes base 110, substrate 120, one or more light emitting elements 130, light flux controlling member 170 and cover 180. Each of these components is described hereunder.

(1) Base, Substrate and Light Emitting Element

Light emitting element 130 is a light source of illumination apparatus 100, and is mounted on substrate 120 fixed on base 110. Light emitting element 130 is, for example, a light-emitting diode (LED) such as a white light-emitting diode. In a case where a plurality of light emitting elements 130 are mounted on substrate 120, the respective light emitting elements 130 may be disposed in a circle. The shape of substrate 120 is not particularly limited as long as light emitting element 130 can be mounted thereon, and the shape need not be a tabular shape. The shape of base 110 is not particularly limited as long as at least substrate 120 can be fixed thereon, and the shape need not be a tabular shape.

(2) Light Flux Controlling Member

Figure 4:
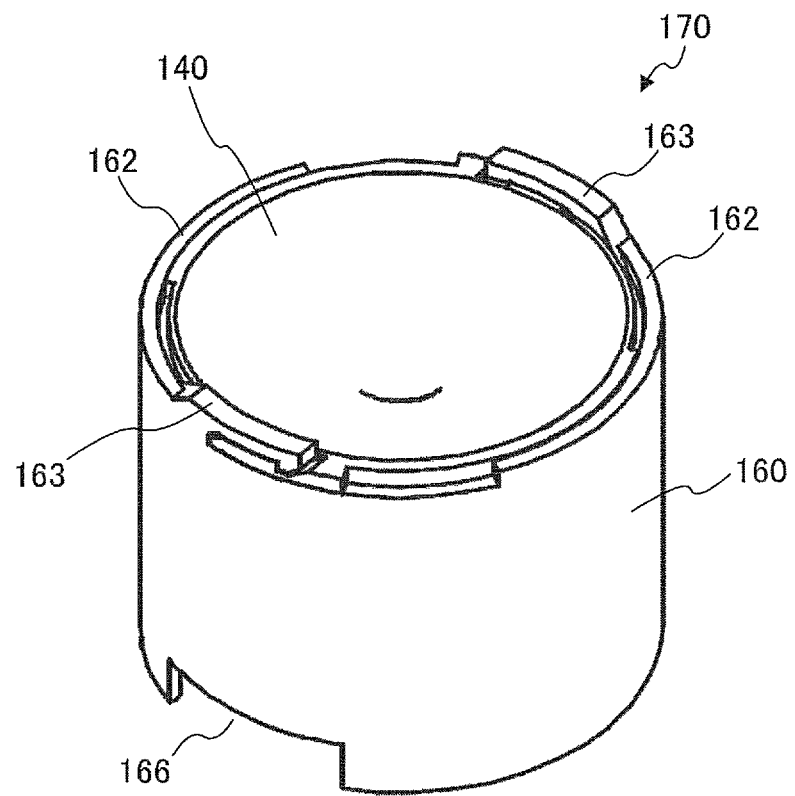
FIG. 4 is a perspective view of the light flux controlling member according to Embodiment 1.
Figure 5A:
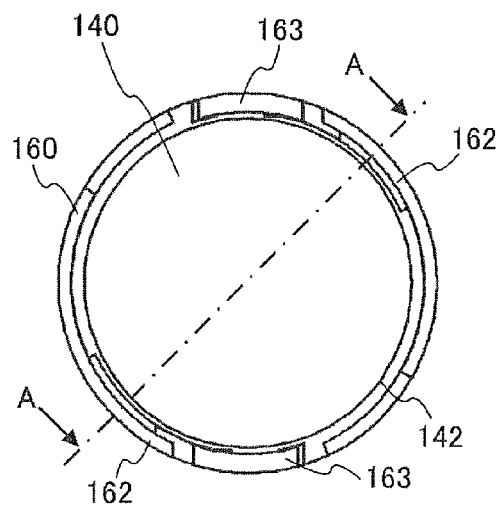
FIG. 5A is a plan view of the light flux controlling member according to Embodiment 1.
Figure 5B:
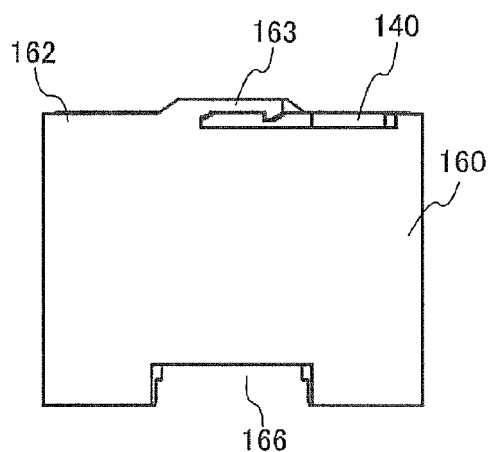
FIG. 5B is a front view of the light flux controlling member according to Embodiment 1.
Figure 5C:
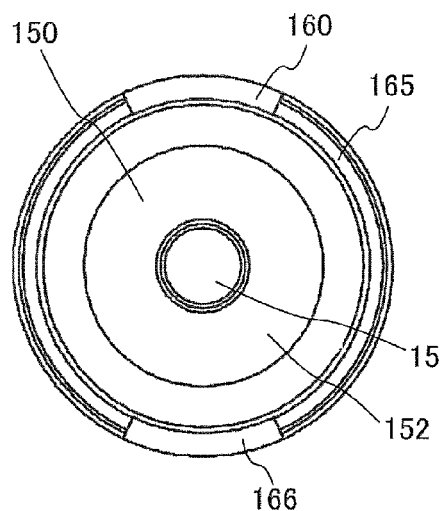
FIG. 5C is a bottom view of the light flux controlling member according to Embodiment 1.
Figure 5D:
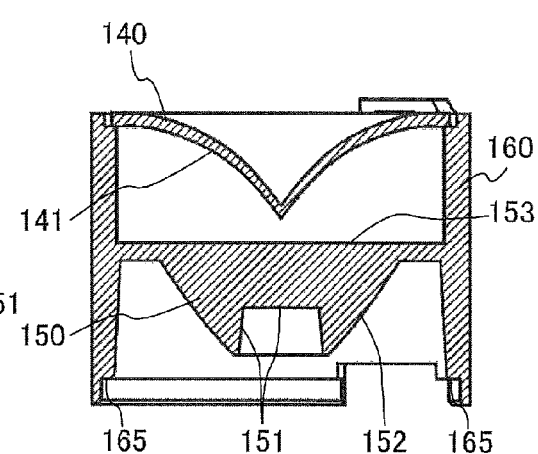
FIG. 5D is a cross-sectional view taken along line A-A shown in FIG. 5A.
Figure 6:
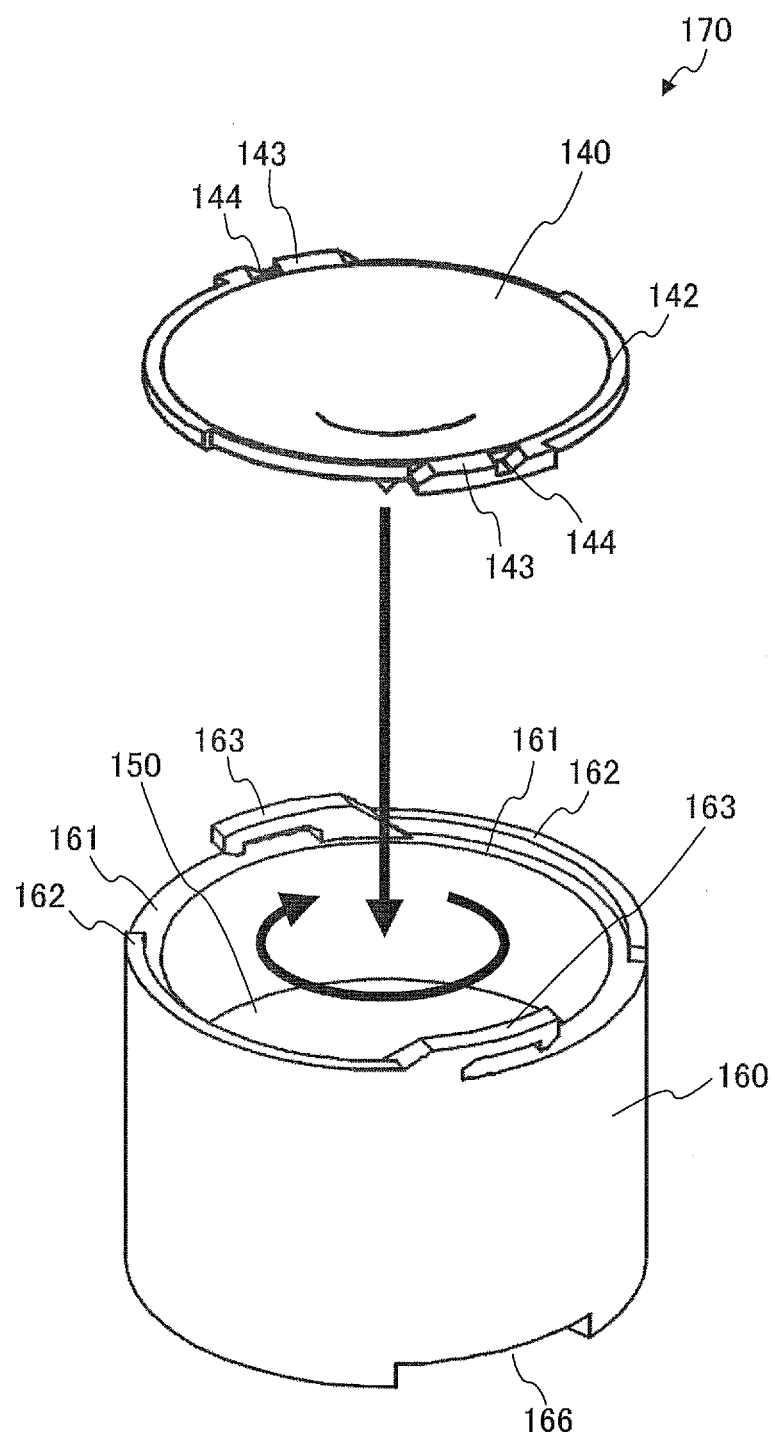
FIG. 6 is an exploded perspective view of the light flux controlling member according to Embodiment 1.

Light flux controlling member 170 controls the light distribution of light emitted from light emitting element 130. FIG. 4 and FIGS. 5A to 5D illustrate the configuration of light flux controlling member 170. FIG. 4 is a perspective view, FIG. 5A is a plan view, FIG. 5B is a front view, FIG. 5C is a bottom view, and FIG. 5D is a cross-sectional view taken along line A-A shown in FIG. 5A. Further, FIG. 6 is an exploded perspective view of light flux controlling member 170. As shown in these drawings, light flux controlling member 170 includes first light flux controlling member 140 (transflective member), second light flux controlling member 150 (light condensing member), and holder 160 (supporting member and diffused transmission member). Second light flux controlling member 150 and holder 160 are integrated.

The respective components of light flux controlling member 170 are described hereunder in the order of holder 160, second light flux controlling member 150 and first light flux controlling member 140.

(2-1) Holder

Figure 7A:
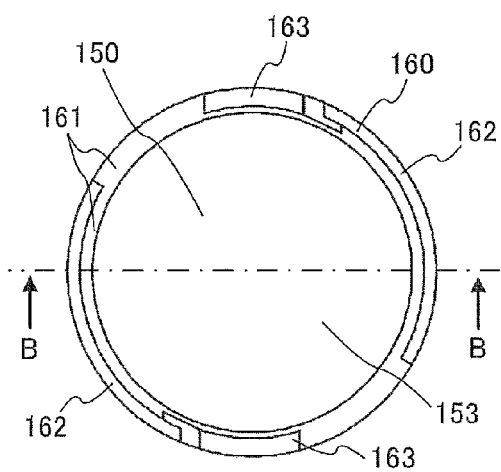
FIG. 7A is a plan view of a second light flux controlling member and a holder.
Figure 7B:
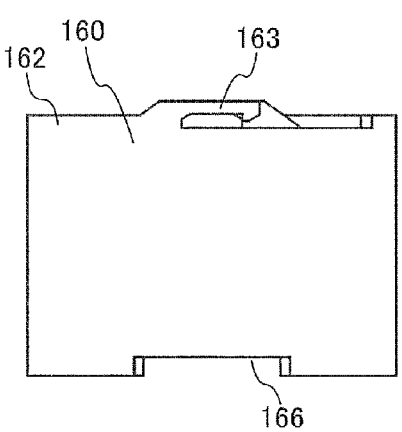
FIG. 7B is a front view of the second light flux controlling member and the holder.
Figure 7C:
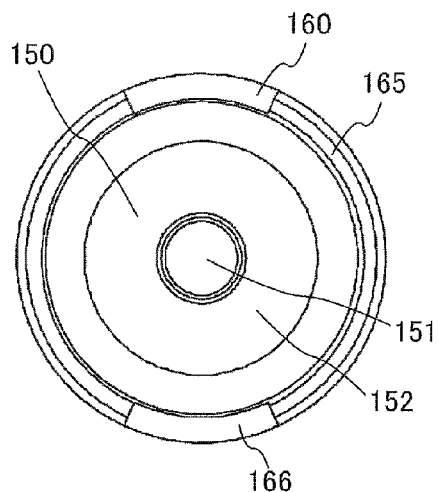
FIG. 7C is a bottom view of the second light flux controlling member and the holder.
Figure 7D:
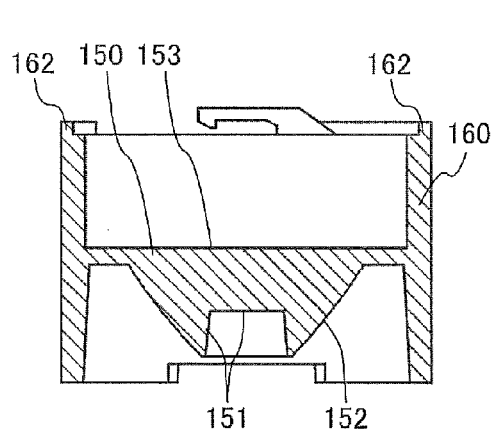
FIG. 7D is a cross-sectional view taken along line B-B shown in FIG. 7A.

FIGS. 7A to 7D illustrate the configuration of second light flux controlling member 150 and holder 160. FIG. 7A is a plan view, FIG. 7B is a front view, FIG. 7C is a bottom view, and FIG. 7D is a cross-sectional view taken along line B-B shown in FIG. 7A. As described above, second light flux controlling member 150 and holder 160 are integrated.

Holder 160 is positioned by base 110, and positions first light flux controlling member 140 and second light flux controlling member 150 with respect to light emitting element 130. As shown in FIG. 3, optical axis LA of light emitting element 130, central axis CA1 of first light flux controlling member 140, and central axis CA2 of second light flux controlling member 150 coincide with each other.

Holder 160 is an optically transparent member formed in a substantially cylindrical shape. First light flux controlling member 140 is fixed at one end of holder 160. The other end of holder 160 is fixed to base 110. In the following description, of the two ends of holder 160, the end at which first light flux controlling member 140 is fixed is referred to as "upper end" and the end that is fixed to base 110 is referred to as "lower end".

Holder 160 is formed together with second light flux controlling member 150 by integral molding. The material of holder 160 is not particularly limited as long as the material can transmit light of a desired wavelength. Examples of the material of holder 160 include optically transparent resins such as polymethylmethacrylate (PMMA), polycarbonate (PC), and epoxy resin (EP), or glass. In the case of providing holder 160 with a light diffusing capability, scatterers may be included in these optically transparent materials, or a light diffusion process may be performed on the surface of holder 160.

As shown in FIG. 6, guide protrusion 162 and hook 163 are provided at the upper end of holder 160 to fix first light flux controlling member 140 on end face 161 of the upper end.

Guide protrusion 162 is formed at a part of an outer peripheral portion of end face 161 of the upper end, and prevents first light flux controlling member 140 moving in the radial direction of holder 160. The number of guide protrusions 162 is not particularly limited, and is normally two or more. In the example illustrated in FIG. 6, holder 160 has two guide protrusions 162 that face each other. The shape of guide protrusion 162 is not particularly limited as long as guide protrusion 162 can radially fit together with first light flux controlling member 140. In the example illustrated in FIG. 6, guide protrusion 162 has a circular arc shape in a plan view.

Hook 163 is formed on end face 161 of the upper end. As described later, together with fitting portion 143 (recess 144) of first light flux controlling member 140, hook 163 prevents detachment and rotation of first light flux controlling member 140. The number of hooks 163 is not particularly limited, and is normally two or more. In the example illustrated in FIG. 6, holder 160 has two hooks 163 that face each other. The shape of hook 163 is not particularly limited as long as hook 163 can be engaged with recess 144 of first light flux controlling member 140 when first light flux controlling member 140 is rotated.

End face 161 for mounting first light flux controlling member 140 is formed over the entire circumference of the upper end of holder 160. That is, end face 161 is also present at the inner side of guide protrusion 162 and the inner side of hook 163 (see FIG. 7A). Accordingly, when light flux controlling member 170 is seen in a plan view, an outer peripheral portion (flange 142) of first light flux controlling member 140 overlaps with end face 161 of the upper end over the entire circumference thereof. Consequently, leakage of light from a gap between first light flux controlling member 140 and holder 160 is prevented.

Stepped portion 165 for positioning holder 160 on base 110 is provided at the lower end of holder 160. Further, ventilation opening 166 for ventilating the air around second light flux controlling member 150 is also provided at the lower end of holder 160.

(2-2) Second Light Flux Controlling Member

Second light flux controlling member 150 controls the traveling direction of part of light emitted from light emitting element 130, and functions so that the light distribution of light emitted from second light flux controlling member 150 is narrower than the light distribution of light emitted from light emitting element 130. As shown in FIG. 7A, second light flux controlling member 150 is a member formed in a substantially circular shape in a plan view. Second light flux controlling member 150 is supported by holder 160, and is disposed with respect to light emitting element 130 with an air layer interposed therebetween so that central axis CA2 thereof coincides with optical axis LA (see FIG. 3). In a case where a plurality of light emitting elements 130 are disposed on substrate 120, the term "optical axis LA of light emitting element 130" refers to the traveling direction of light at the center of three-dimensional light fluxes from the plurality of light emitting elements 130.

As shown in FIGS. 7A to 7D, second light flux controlling member 150 includes incidence surface 151 on which light emitted from light emitting element 130 is incident, total reflection surface 152 that totally reflects part of the light that is incident from incidence surface 151, and emission surface 153 that emits part of the light that is incident from incidence surface 151 and light that is reflected by total reflection surface 152.

As described above, second light flux controlling member 150 is formed together with holder 160 by integral molding. The material of second light flux controlling member 150 is not particularly limited as long as the material is a highly transparent material that can transmit light of a desired wavelength. Examples of the material of second light flux controlling member 150 include optically transparent resins such as polymethylmethacrylate (PMMA), polycarbonate (PC), and epoxy resin (EP), or glass.

Incidence surface 151 causes the light emitted from light emitting element 130 to be incident on the inside of second light flux controlling member 150. Incidence surface 151 is the inner face of a recess formed in the bottom of second light flux controlling member 150. Incidence surface 151 is formed at a position opposing light emitting element 130 so as to intersect with central axis CA2 of second light flux controlling member 150. Incidence surface 151 is a rotationally symmetric plane about central axis CA2 of second light flux controlling member 150. Incidence surface 151 includes an inner top face that constitutes the top face of the recess, and a tapered inner side face that constitutes the side face of the recess. The inner diameter of the inner side face gradually increases from the inner top face side toward the opening edge side so that the dimensions of the inner diameter on the opening edge side are larger than the dimensions of the inner diameter of the edge on the inner top face side (see FIG. 7D).

Total reflection surface 152 totally reflects part of the light that was incident on incidence surface 151 toward first light flux controlling member 140. Total reflection surface 152 is a surface extending from the outer edge of the bottom of second light flux controlling member 150 to the outer edge of emission surface 153. A flange may be provided between the outer edge of total reflection surface 152 and the outer edge of emission surface 153 (see FIG. 7D). Total reflection surface 152 is a rotationally symmetric plane that is formed so as to surround central axis CA2 of second light flux controlling member 150. The diameter of total reflection surface 152 gradually increases from the bottom side toward the side of emission surface 153. A generating line constituting total reflection surface 152 is an arc-shaped curve that is convex to the outside (the side away from central axis CA2). The generating line constituting total reflection surface 152 may be set to a straight line depending on the light distribution characteristics required for illumination apparatus 100, and total reflection surface 152 may have a tapered shape. Note that the term "generating line" generally means a straight line that is used to draw a ruled surface, and in the present invention the term "generating line" is used as a term that includes a curve for drawing total reflection surface 152 that is a rotationally symmetric plane.

Emission surface 153 emits part of the light that was incident on incidence surface 151 and light that was totally reflected by total reflection surface 152 toward first light flux controlling member 140. Emission surface 153 is a surface located on the opposite side of incidence surface 151 (bottom) in second light flux controlling member 150, and is formed so as to intersect with optical axis LA of light emitting element 130. That is, emission surface 153 is formed so as to oppose first light flux controlling member 140 (see FIG. 5D).

(2-3) First Light Flux Controlling Member

FIGS. 8A to 8E illustrate the configuration of first light flux controlling member 140. FIG. 8A is a plan view, FIG. 8B is a front view, FIG. 8C is a bottom view, FIG. 8D is a cross-sectional view taken along line C-C shown in FIG. 8A, and FIG. 8E is a right side view.

First light flux controlling member 140 reflects part of the light emitted from second light flux controlling member 150 (light emitted from light emitting element 130) while controlling the traveling direction thereof, and transmits the remaining part. First light flux controlling member 140 is a member formed in a substantially circular shape in a plan view, and has two principal surfaces that are in a front-and-rear relationship. First light flux controlling member 140 is supported by holder 160, and is disposed with respect to second light flux controlling member 150 with an air layer interposed therebetween so that central axis CA1 thereof coincide with optical axis LA of light emitting element 130. That is, first light flux controlling member 140 is disposed on an opposite side to light emitting element 130 with respect to second light flux controlling member 150, so as to oppose emission surface 153 of second light flux controlling member 150.

First light flux controlling member 140 reflects part of the light emitted from second light flux controlling member 150 and transmits another part thereof. Means for providing first light flux controlling member 140 with such a function is not particularly limited. For example, a transflective film may be formed on the surface (surface opposing light emitting element 130) of first light flux controlling member 140 that is formed of an optically transparent material. Examples of the optically transparent material include transparent resin materials such as polymethylmethacrylate (PMMA), polycarbonate (PC) and epoxy resin (EP), and transparent glass. Examples of the transflective film include dielectric multilayer films such as a multilayer film composed of $TiO_2$ and $SiO_2$, a multilayer film composed of $ZrO_2$ and $SiO_2$, and a multilayer film composed of $Ta_2O_5$ and $SiO_2$, or a metallic thin film formed of aluminum (Al) or the like. Light scatterers such as beads may be dispersed in first light flux controlling member 140 that is formed of an optically transparent material. That is, first light flux controlling member 140 may be formed of a material that reflects some light and transmits some light. Further, a light-transmitting portion may be formed in first light flux controlling member 140 that is formed of an optically reflective material. Examples of the optically reflective material include white resins and metals. Examples of the light-transmitting portion include a through-hole and a bottomed recess. In the latter case, light emitted from second light flux controlling member 150 passes through the bottom (portion having a thin thickness) of the recess. For example, first light flux controlling member 140 having both functions of optical reflectivity and optical transparency can be formed using white polymethyl methacrylate with visible ray transmittance of about 20% and reflectance of about 78%.

First light flux controlling member 140 includes reflection surface 141 that opposes second light flux controlling member 150 and that reflects part of the light emitted from second light flux controlling member 150. Reflection surface 141 reflects part of the light emitted from second light flux controlling member 150 toward holder 160. The reflected light passes through holder 160 and reaches the middle portion (side portion) and the lower portion of cover 180.

Reflection surface 141 of first light flux controlling member 140 is a rotationally symmetric (circularly symmetric) plane about central axis CA1 of first light flux controlling member 140. As shown in FIG. 5D, the generating line extending from the center of the rotationally symmetric plane to the outer peripheral portion is a curve that is concave with respect to light emitting element 130 (second light flux controlling member 150), and reflection surface 141 is a curved surface formed by rotating the generating line 360°. That is, reflection surface 141 has an aspheric curved surface in which the height from light emitting element 130 increases from the center toward the outer peripheral portion. The outer peripheral portion of reflection surface 141 is formed at a position at which the distance (height) from light emitting element 130 in the direction of optical axis LA of light emitting element 130 is greater than at the center of reflection surface 141. For example, reflection surface 141 is an aspheric curved surface in which the height from light emitting element 130 increases from the center toward the outer peripheral portion, or an aspheric curved surface in which, from a central portion until a predetermined location, the height from light emitting element 130 (substrate 120) increases from the central portion toward the outer peripheral portion, and from the predetermined location until the outer peripheral portion, the height from light emitting element 130 decreases from the central portion toward the outer peripheral portion. In the former case, an inclining angle of reflection surface 141 with respect to the plane direction of substrate 120 decreases from the center toward the outer peripheral portion. On the other hand, in the latter case, in reflection surface 141, a point at which the inclining angle with respect to the plane direction of substrate 120 is zero (parallel to substrate 120)

exists at a position which is between the center and the outer peripheral portion and is close to the outer peripheral portion. As described above, the term "generating line" generally means a straight line that is used to draw a ruled surface, and in the present invention the term "generating line" is used as a term that includes a curve for drawing reflection surface 141 that is a rotationally symmetric plane.

As shown in FIGS. 8A to 8D, flange 142 that can be mounted on the end face 161 of holder 160 is provided at the outer peripheral portion of first light flux controlling member 140. The width of flange 142 differs depending on the location so that first light flux controlling member 140 can rotate at a predetermined angle in a state in which first light flux controlling member 140 and guide protrusion 162 of holder 160 are fitted together radially (see FIG. 8A).

Fitting portion 143 that is positioned between hook 163 and end face 161 of holder 160 when first light flux controlling member 140 is mounted on end face 161 of holder 160 is also provided in outer peripheral portion of first light flux controlling member 140. Recess 144 that corresponds to hook 163 of holder 160 is provided in one face (face on the side of cover 180) of fitting portion 143. Together with hook 163 of holder 160, fitting portion 143 (recess 144) prevents first light flux controlling member 140 from rotating. The number of fitting portions 143 (recesses 144) is normally the same as the number of hooks 163. In the example illustrated in FIG. 6, first light flux controlling member 140 has two fitting portions 143 (recess 144). The shape of fitting portion 143 is not particularly limited as long as recess 144 can be engaged with hook 163 of holder 160 when first light flux controlling member 140 is rotated.

As will be described later, first light flux controlling member 140 is fixed on end face 161 of holder 160 by being rotated on end face 161 of holder 160 to cause hooks 163 to engage with recesses 144 (see FIG. 6).

(3) Cover

Cover 180 is positioned by base 110, and diffuses and transmits light (reflected light and transmitted light) whose traveling direction is controlled by light flux controlling member 170. Cover 180 is a member in which a hollow region having an opening is funned. Substrate 120, light emitting element 130, and light flux controlling member 170 are disposed in the hollow region of cover 180.

Means for providing cover 180 with a light diffusing capability is not particularly limited. For example, a light diffusion process (for example, a roughening process) may be performed on the inner face or the outer face of cover 180, or cover 180 may be manufactured using a light-diffusing material (for example, an optically transparent material including scatterers such as beads). The shape of cover 180 is not particularly limited as long as desired light distribution characteristics can be realized. For example, cover 180 may have a spherical crown shape (a shape obtained by horizontally cutting part of a spherical surface).

Next, the optical path of light emitted from light emitting element 130 in illumination apparatus 100 of the present embodiment will be described.

Light that is emitted from light emitting element 130 at large angles with respect to optical axis LA of light emitting element 130 is incident on second light flux controlling member 150 from incidence surface 151 (inner side face). Part of the light incident on second light flux controlling member 150 is reflected toward first light flux controlling member 140 by total reflection surface 152, and is emitted from emission surface 153. Part of the light emitted from emission surface 153 of second light flux controlling member 150 passes through first light flux controlling member 140 and reaches the upper portion of cover 180. Further, part of the light emitted from emission surface 153 of second light flux controlling member 150 is reflected by first light flux controlling member 140, and passes through holder 160 and reaches the middle portion and lower portion of cover 180.

On the other hand, light that is emitted from light emitting element 130 at small angles with respect to optical axis LA of light emitting element 130 is incident on second light flux controlling member 150 from incidence surface 151 (inner top face), and is emitted toward first light flux controlling member 140 from emission surface 153 directly. Part of the light emitted from emission surface 153 of second light flux controlling member 150 passes through first light flux controlling member 140 and reaches the upper portion of cover 180. Further, part of the light emitted from emission surface 153 of second light flux controlling member 150 is reflected by first light flux controlling member 140, and passes through holder 160 and reaches the middle portion and lower portion of cover 180.

Thus, in illumination apparatus 100 of the present embodiment, a large part of the light that reaches first light flux controlling member 140 is light that is incident inside second light flux controlling member 150 and is emitted from second light flux controlling member 150.

According to illumination apparatus 100 of the present embodiment, of the light that is emitted from light emitting element 130, at least light that is emitted within an angular range from a direction in which light of a maximum intensity is emitted (for example, direction of optical axis LA) to a direction in which light having an intensity that is half of the maximum intensity is emitted (hereunder, referred to as "light within a half-intensity-angular-range") passes through at least one of holder 160 and first light flux controlling member 140, and is emitted from an inner region surrounded by holder 160 and first light flux controlling member 140 to an outer region. In other words, light flux controlling member 170 according to the present embodiment is formed so that light within a half-intensity-angular-range passes through at least any one of holder 160 and first light flux controlling member 140.

Figure 2:
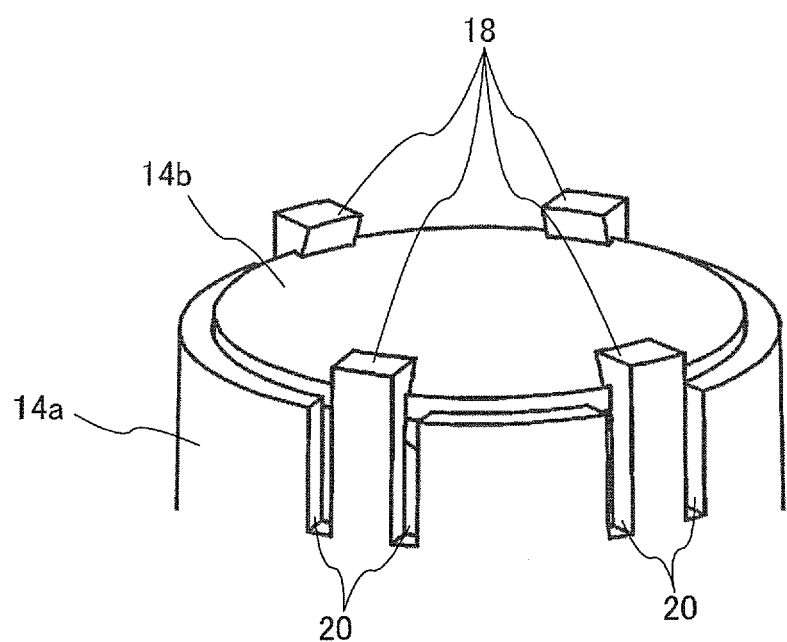
FIG. 2 is a perspective view illustrating an example of a method for fixing a transflective member.

As shown in FIG. 2, in a case where notch portions 20 are formed at the upper end of the holder (case body 14a), comparatively strong light leaks out from notch portions 20. Therefore, a bright part is liable to arise on a surface to be irradiated or a cover (cover that covers the light flux controlling member). In particular, when light within a half-intensity-angular-range leaks out from notch portions 20, there is a risk that a bright part will become pronounced depending on the position on the surface to be irradiated or the cover. In contrast, if the light is light emitted at a large angle with respect to the optical axis of the light emitting element (light at an angle equal to or greater than a half-intensity angle, and that is emitted towards the direction of ventilation opening 166), even if the light is emitted directly to outside without passing through holder 160 or first light flux controlling member 140 and irradiates a surface to be irradiated or a cover, a specific bright part cannot easily occur.

[Method of Manufacturing Light Flux Controlling Member]

Light flux controlling member 170 according to the present embodiment can be manufactured by the following procedure, for example.

First, first light flux controlling member 140 including reflection surface 141 is formed by injection molding. The method of manufacturing first light flux controlling member 140 is not particularly limited. For example, first light flux controlling member 140 can be manufactured by injection molding using a colorless and transparent resin material, and thereafter depositing a transflective film on a face (face opposing second light flux controlling member 150) that is to serve as reflection surface 141 of the resultant resin molded product. First light flux controlling member 140 can also be manufactured by injection molding using a white resin material.

Further, second light flux controlling member 150 and holder 160 are integrally formed in a single unit by injection molding using a colorless and transparent resin material.

Subsequently, as shown in FIG. 6, flange 142 of first light flux controlling member 140 is mounted on end face 161 of the upper end of holder 160, and first light flux controlling member 140 and guide protrusions 162 of holder 160 are fitted together radially. In this state, when first light flux controlling member 140 is rotated in a predetermined direction, fitting portions 143 of first light flux controlling member 140 engage between hooks 163 and end face 161 of holder 160. That is, hooks 163 of holder 160 engage with recesses 144 of first light flux controlling member 140.

By performing the above described procedure, light flux controlling member 170 according to the present embodiment that includes first light flux controlling member 140, second light flux controlling member 150 and holder 160 can be manufactured without using adhesive and without providing notch portions in holder 160.

[Advantageous Effects]

Light flux controlling member 170 according to Embodiment 1 can control the traveling direction of light emitted from light emitting element 130 by using first light flux controlling member 140 and second light flux controlling member 150, and thereby distribute the emitted light to the forward direction, the lateral direction and the backward direction. Therefore, illumination apparatus 100 that includes light flux controlling member 170 according to Embodiment 1 can control the amounts of light emitted in the forward direction, the lateral direction and the backward direction, and realize light distribution characteristics that are close to those of an incandescent light bulb.

Further, light flux controlling member 170 according to Embodiment 1 reflects part of the light in the lateral direction (direction toward the middle portion of cover 180) and the backward direction (direction toward the lower portion of cover 180) by means of reflection surface 141, and transmits part of the light in the forward direction (direction toward the upper portion of cover 180). At this time, light flux controlling member 170 generates reflected light mainly in the lateral direction in a region on the central portion side of reflection surface 141, and generates reflected light mainly in the backward direction in a region on the outer peripheral portion side of reflection surface 141. Therefore, illumination apparatus 100 according to Embodiment 1 can efficiently illuminate a surface to be irradiated in the backward direction without being obstructed by base 110.

When manufacturing light flux controlling member 170 according to Embodiment 1, first light flux controlling member 140 that has both optical transparency and optical reflectivity and holder 160 that has optical transparency are manufactured separately. It is therefore possible to easily adjust the optical properties of first light flux controlling member 140 irrespective of holder 160. Likewise, the optical properties of holder 160 can also be easily adjusted irrespective of first light flux controlling member 140.

Further, when manufacturing light flux controlling member 170 according to Embodiment 1, first light flux controlling member 140 can be fixed on holder 160 without gaps and without using an adhesive by merely mounting first light flux controlling member 140 on end face 161 of holder 160 and rotating first light flux controlling member 140. It is therefore possible to manufacture light flux controlling member 170 according to Embodiment 1 without reducing the optical properties thereof and without increasing the manufacturing cost.

Embodiment 2

An illumination apparatus and a light flux controlling member according to Embodiment 2 differ from illumination apparatus 100 and light flux controlling member 170 according to Embodiment 1 only in the shape of the holder. Therefore, components that are the same as in illumination apparatus 100 and light flux controlling member 170 according to Embodiment 1 are denoted by the same reference numerals, and a description thereof is omitted hereunder.

Figure 9:
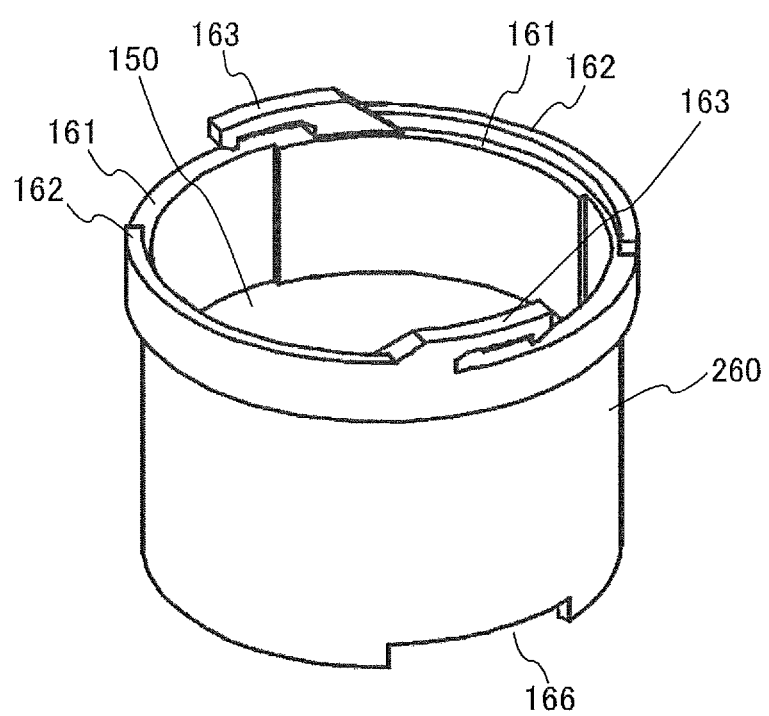
FIG. 9 is a perspective view of a second light flux controlling member and a holder included in a light flux controlling member according to Embodiment 2.
Figure 10A:
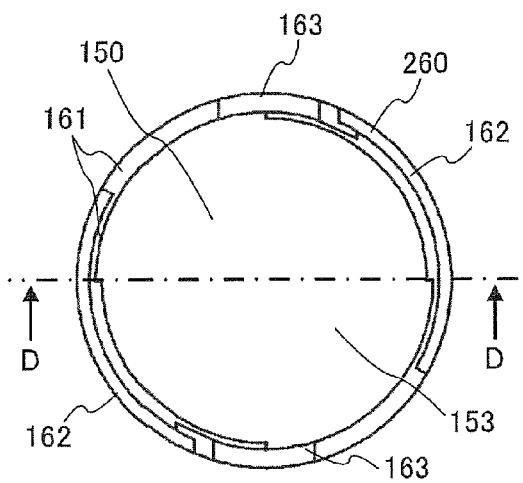
FIG. 10A is a plan view of the second light flux controlling member and the holder.
Figure 10B:
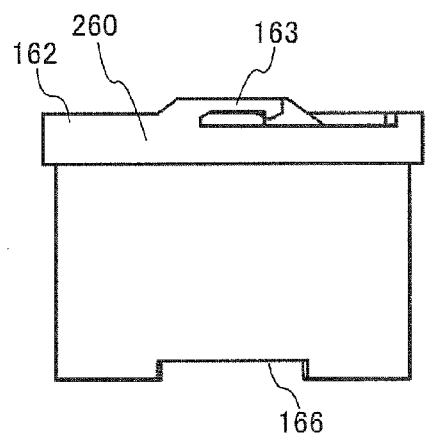
FIG. 10B is a front view of the second light flux controlling member and the holder.
Figure 10C:
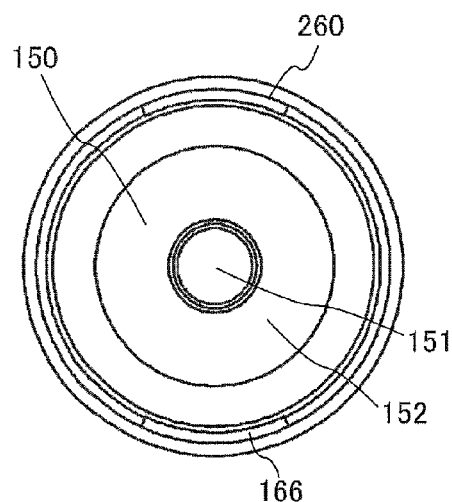
FIG. 10C is a bottom view of the second light flux controlling member and the holder.
Figure 10D:
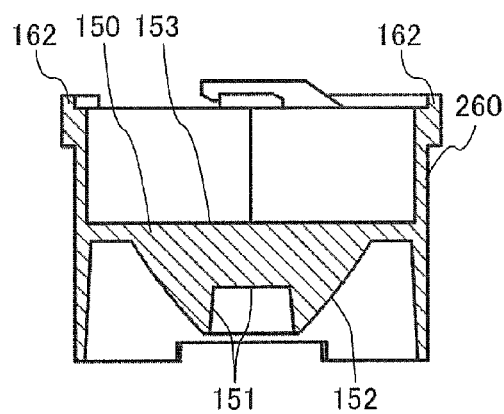
FIG. 10D is a cross-sectional view taken along line D-D shown in FIG. 10A.

FIG. 9 and FIGS. 10A to 10D illustrate the configuration of second light flux controlling member 150 and holder 260 that are included in the light flux controlling member according to Embodiment 2. FIG. 9 is a perspective view, FIG. 10A is a plan view, FIG. 10B is a front view, FIG. 10C is a bottom view, and FIG. 10D is a cross-sectional view taken along line D-D shown in FIG. 10A. As shown in these drawings, second light flux controlling member 150 and holder 260 are integrated.

Holder 260 included in the light flux controlling member according to Embodiment 2 has fundamentally the same structure as holder 160 included in light flux controlling member 170 according to Embodiment 1. However, holder 260 differs from holder 160 in the respect that the wall thickness thereof is thinned within a range that can secure the light intensity and prevent the occurrence of light leakage. As shown in FIG. 10A and FIG. 10D, the wall thickness of holder 260 differs depending on the location.

[Advantageous Effects]

The light flux controlling member according to Embodiment 2 has the same advantageous effects as light flux controlling member 170 according to Embodiment 1, while also being lighter than light flux controlling member 170 according to Embodiment 1.

Embodiment 3

An illumination apparatus and a light flux controlling member according to Embodiment 3 differ from illumination apparatus 100 and light flux controlling member 170 according to Embodiment 1 only in the shape of the holder. Therefore, components that are the same as in illumination apparatus 100 and light flux controlling member 170 according to Embodiment 1 are denoted by the same reference numerals, and a description thereof is omitted hereunder.

Figure 11:
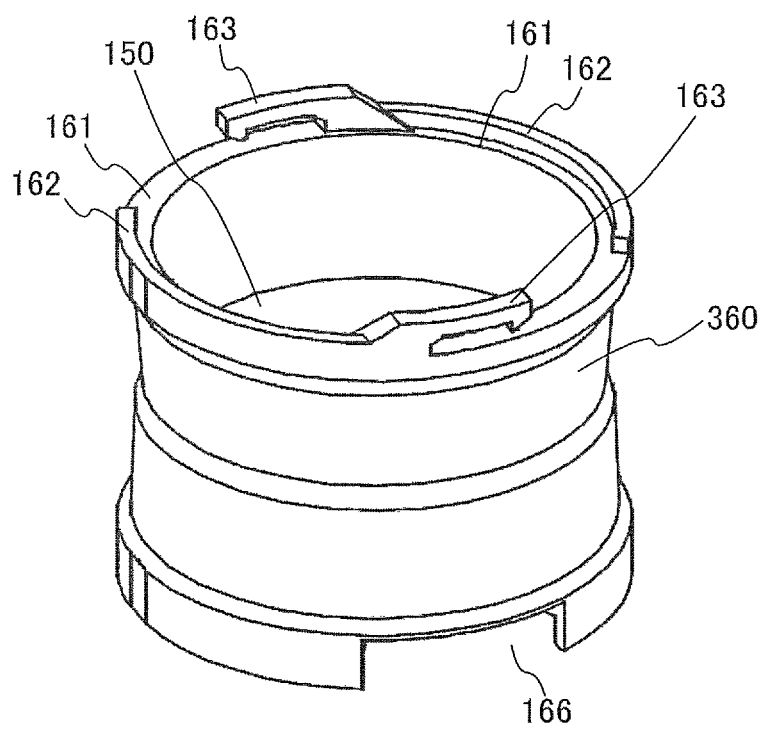
FIG. 11 is a perspective view of a second light flux controlling member and a holder included in a light flux controlling member according to Embodiment 3.
Figure 12A:
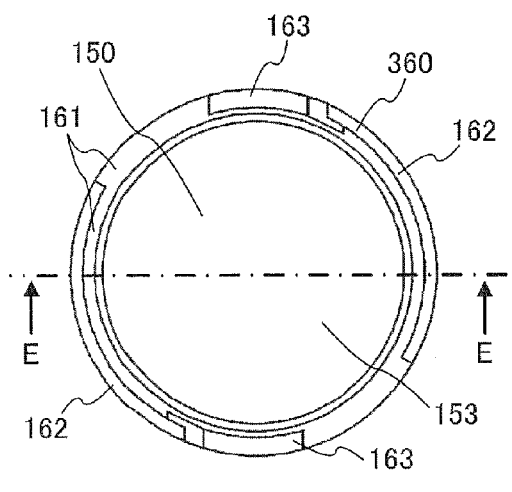
FIG. 12A is a plan view of the second light flux controlling member and the holder.
Figure 12B:
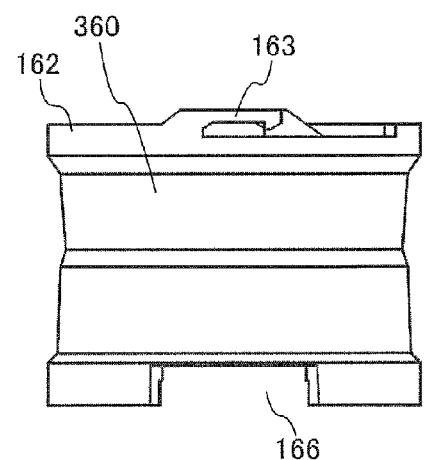
FIG. 12B is a front view of the second light flux controlling member and the holder.
Figure 12C:
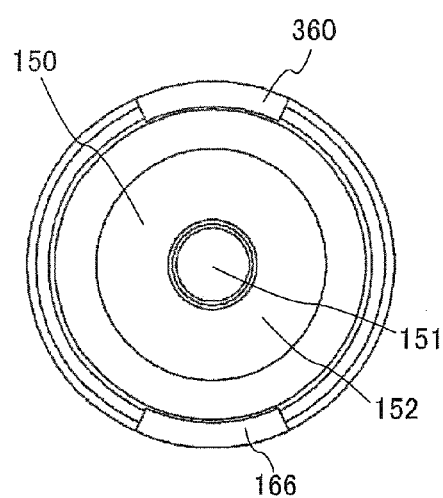
FIG. 12C is a bottom view of the second light flux controlling member and the holder.
Figure 12D:
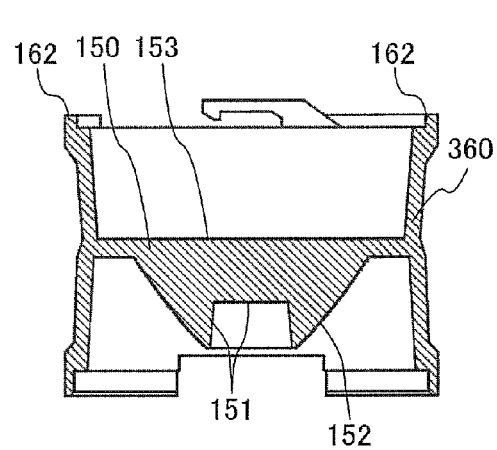
FIG. 12D is a cross-sectional view taken along line E-E shown in FIG. 12A.

FIG. 11 and FIGS. 12A to 12D illustrate the configuration of second light flux controlling member 150 and holder 360 that are included in the light flux controlling member according to Embodiment 3. FIG. 11 is a perspective view, FIG. 12A is a plan view, FIG. 12B is a front view, FIG. 12C is a bottom view, and FIG. 12D is a cross-sectional view taken along line E-E shown in FIG. 12A. As shown in these drawings, second light flux controlling member 150 and holder 360 are integrated.

Holder 360 included in the light flux controlling member according to Embodiment 3 has fundamentally the same structure as holder 160 included in light flux controlling member 170 according to Embodiment 1. However, holder 360 differs from holder 160 in the respect that the wall thickness thereof is thinned within a range that can secure the light intensity and prevent the occurrence of light leakage. As shown in FIG. 12A and FIG. 12D, the wall thickness of holder 360 differs depending on the location.

[Advantageous Effects]

The light flux controlling member according to Embodiment 3 has the same advantageous effects as light flux controlling member 170 according to Embodiment 1, while also being lighter than light flux controlling member 170 according to Embodiment 1.

Embodiment 4

An illumination apparatus and a light flux controlling member according to Embodiment 4 differ from illumination apparatus 100 and light flux controlling member 170 according to Embodiment 1 only in the shape of the holder. Therefore, components that are the same as in illumination apparatus 100 and light flux controlling member 170 according to Embodiment 1 are denoted by the same reference numerals, and a description thereof is omitted hereunder.

Figure 13A:
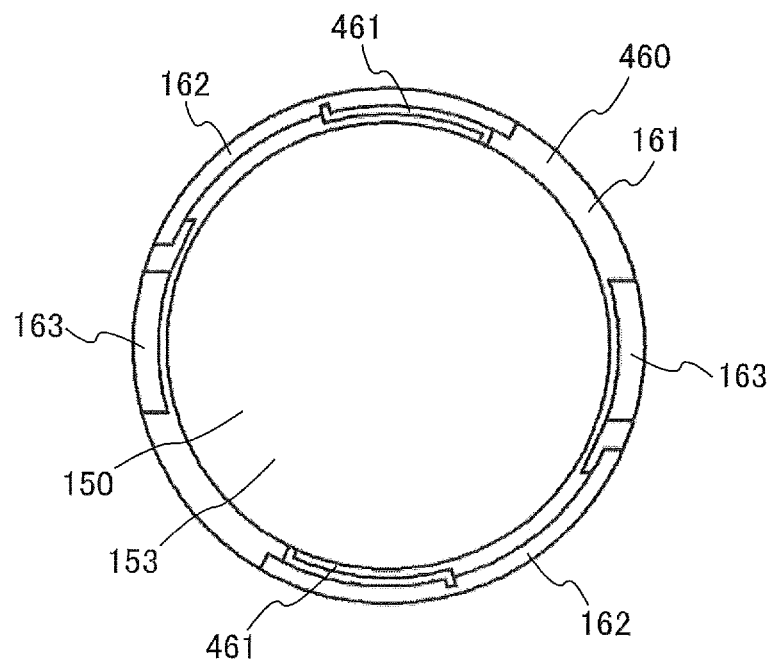
FIG. 13A is a plan view of a second light flux controlling member and a holder included in a light flux controlling member according to Embodiment 4.
Figure 13B:
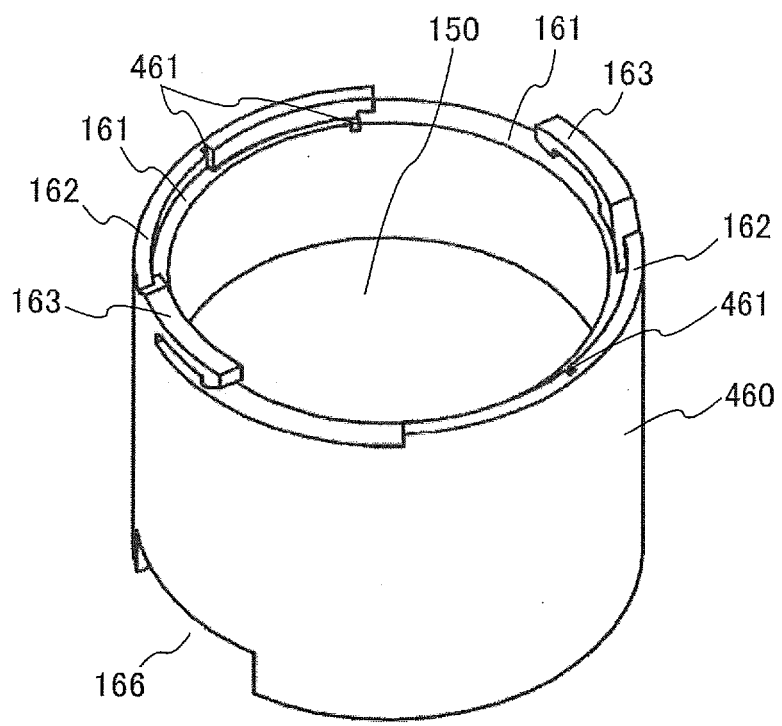
FIG. 13B is a perspective view of the second light flux controlling member and the holder included in the light flux controlling member according to Embodiment 4.

FIGS. 13A and 13B illustrate the configuration of second light flux controlling member 150 and holder 460 included in the light flux controlling member according to Embodiment 4. FIG. 13A is a plan view and FIG. 13B is a perspective view. As shown in these drawings, second light flux controlling member 150 and holder 460 are integrated.

Holder 460 included in the light flux controlling member according to Embodiment 4 has fundamentally the same structure as holder 160 included in light flux controlling member 170 according to Embodiment 1. However, holder 460 differs from holder 160 in the respect that ventilation groove 461 is formed in end face 161 of the upper end thereof and in the inner face of guide protrusion 162. Ventilation groove 461 serves as a ventilation channel for ventilating the air in the space between first light flux controlling member 140 and second light flux controlling member 150 when the opening of holder 460 is blocked by first light flux controlling member 140. As shown in FIG. 13A and FIG. 13B, to prevent the occurrence of light leakage, ventilation groove 461 bends in a crank shape.

[Advantageous Effects]

In addition to having the same advantageous effects as light flux controlling member 170 according to Embodiment 1, the light flux controlling member according to Embodiment 4 also has the advantageous effect that an increase in the temperature in the space between first light flux controlling member 140 and second light flux controlling member 150 can be suppressed.

Embodiment 5

An illumination apparatus and a light flux controlling member according to Embodiment 5 differ from illumination apparatus 100 and light flux controlling member 170 according to Embodiment 1 in that a second light flux controlling member is not included. Therefore, components that are the same as in illumination apparatus 100 and light flux controlling member 170 according to Embodiment 1 are denoted by the same reference numerals, and a description thereof is omitted hereunder.

Figure 14:
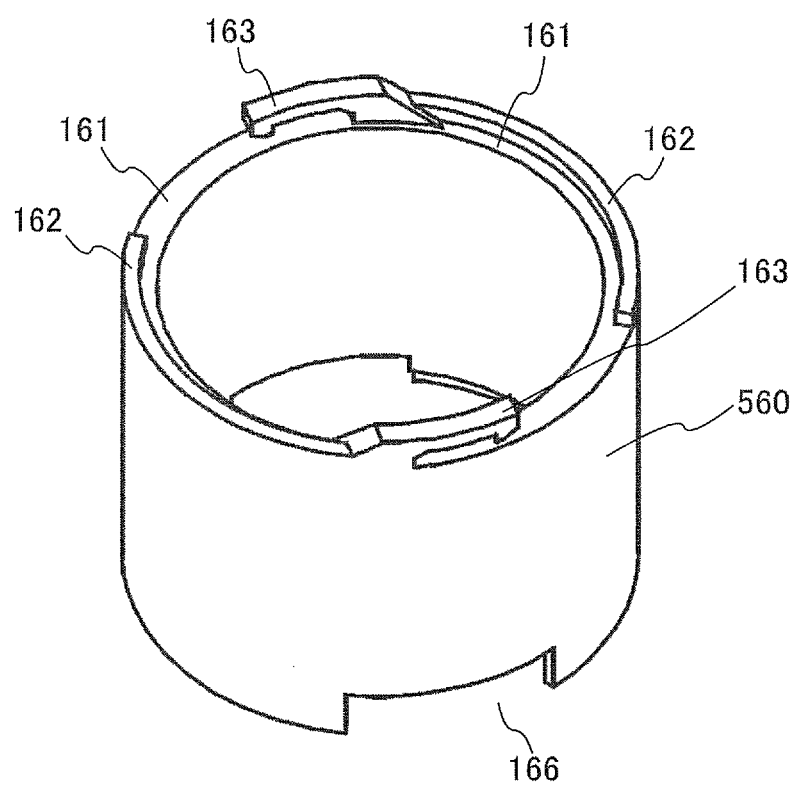
FIG. 14 is a perspective view of a holder included in a light flux controlling member according to Embodiment 5.
Figure 15A:
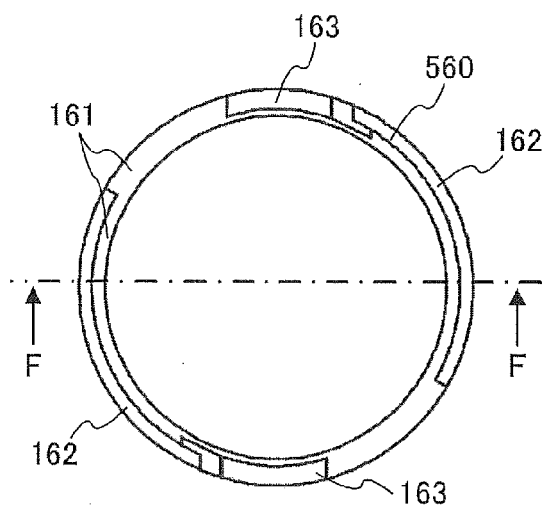
FIG. 15A is a plan view of the holder.
Figure 15B:
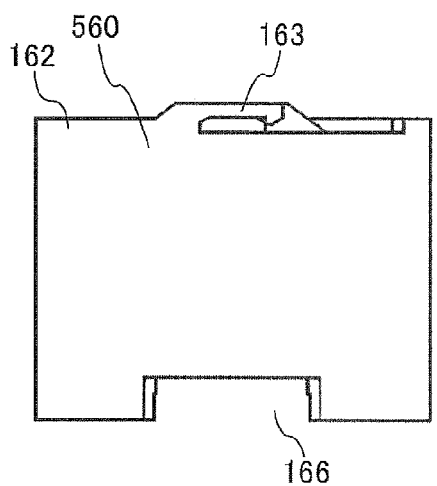
FIG. 15B is a front view of the holder.
Figure 15C:
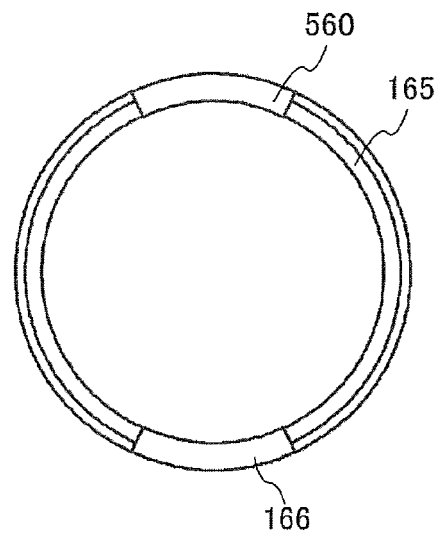
FIG. 15C is a bottom view of the holder.
Figure 15D:
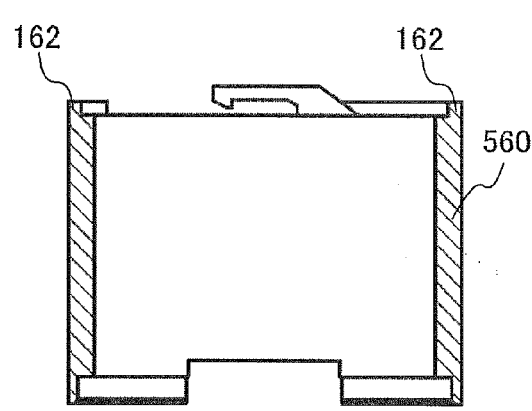
FIG. 15D is a cross-sectional view taken along line F-F shown in FIG. 15A.

FIG. 14 and FIGS. 15A to 15D illustrate the configuration of holder 560 included in the light flux controlling member according to Embodiment 5. FIG. 14 is a perspective view, FIG. 15A is a plan view, FIG. 15B is a front view, FIG. 15C is a bottom view, and FIG. 15D is a cross-sectional view taken along line F-F shown in FIG. 15A.

Holder 560 included in the light flux controlling member according to Embodiment 5 has fundamentally the same structure as holder 160 included in light flux controlling member 170 according to Embodiment 1. However, as shown in FIG. 14 and FIGS. 15A to 15D, holder 560 is not integrated with the second light flux controlling member. Further, a stepped portion or the like for fixing the second light flux controlling member is not provided in holder 560.

[Advantageous Effects]

The light flux controlling member according to Embodiment 5 has the same advantageous effects as light flux controlling member 170 according to Embodiment 1. In a case where it is necessary to adjust the distribution of light in the forward direction, the lateral direction, and the backward direction, it is possible to obtain the intended light distribution by adjusting the balance between the transmission performance and reflection performance or the shape of the reflection surface of first light flux controlling member 140.

Embodiment 6

An illumination apparatus and a light flux controlling member according to Embodiment 6 differ from illumination apparatus 100 and light flux controlling member 170 according to Embodiment 1 in the shape of the second light flux controlling member and the holder. Therefore, components that are the same as in illumination apparatus 100 and light flux controlling member 170 according to Embodiment 1 are denoted by the same reference numerals, and a description thereof is omitted hereunder.

Figure 16:
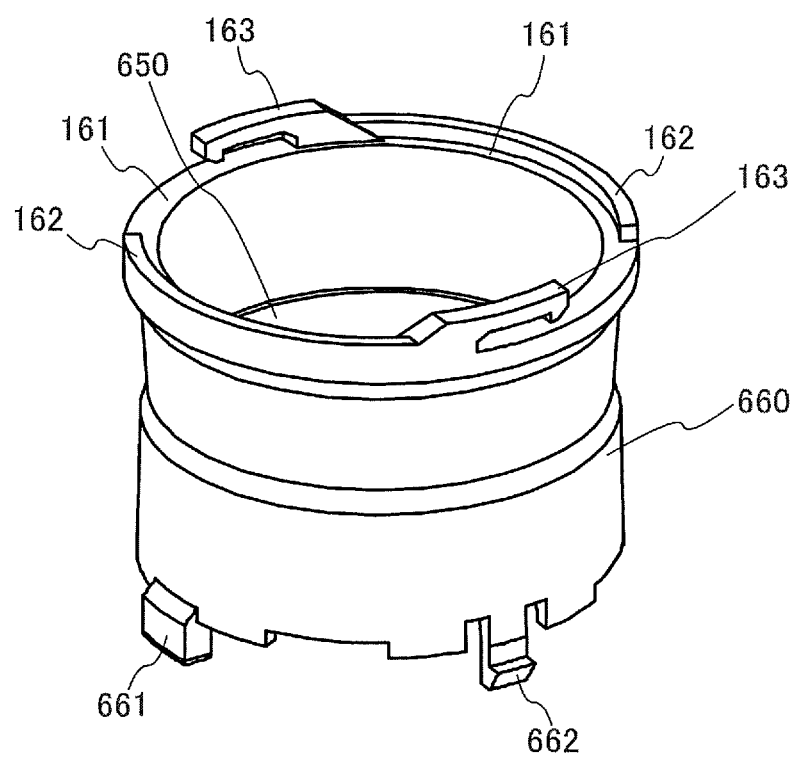
FIG. 16 is a perspective view of a holder included in a light flux controlling member according to Embodiment 6.
Figure 17A:
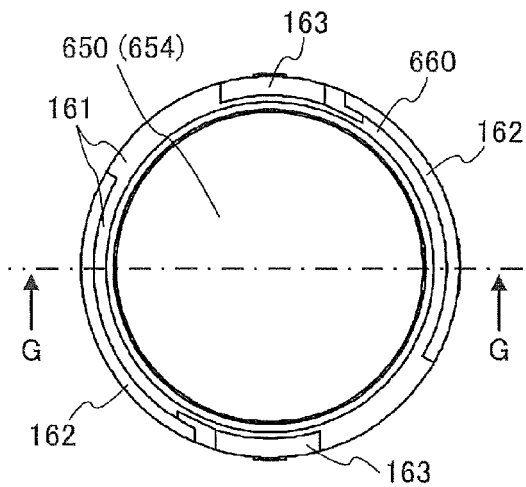
FIG. 17A is a plan view of the holder.
Figure 17B:
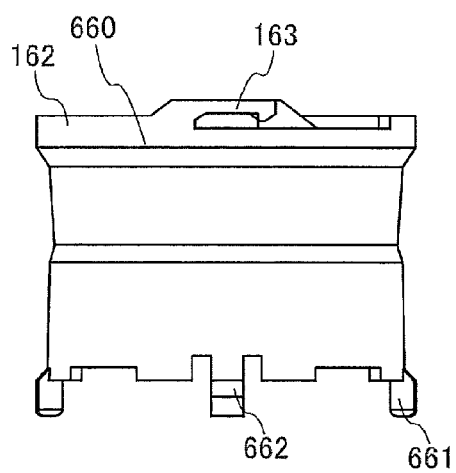
FIG. 17B is a front view of the holder.
Figure 17C:
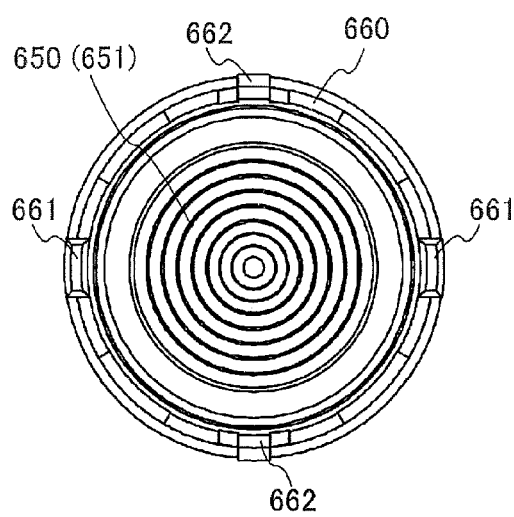
FIG. 17C is a bottom view of the holder.
Figure 17D:
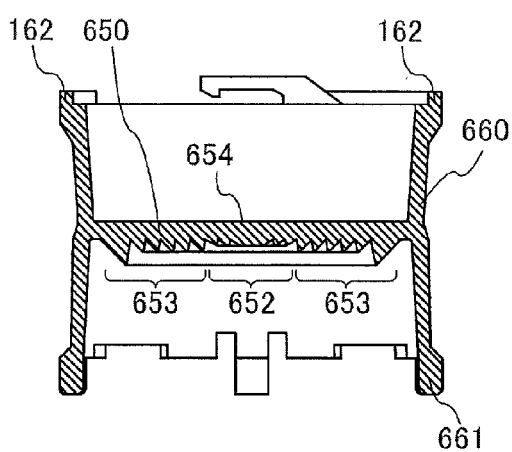
FIG. 17D is a cross-sectional view taken along line G-G shown in FIG. 17A.

FIG. 16 and FIGS. 17A to 17D illustrate the configuration of second light flux controlling member 650 and holder 660 that are included in the light flux controlling member according to Embodiment 6. FIG. 16 is a perspective view, FIG. 17A is a plan view, FIG. 17B is a front view, FIG. 17C is a bottom view, and FIG. 17D is a cross-sectional view taken along line G-G shown in FIG. 17A. As shown in these drawings, second light flux controlling member 650 and holder 660 are integrated.

As shown in FIG. 17D, second light flux controlling member 650 included in the light flux controlling member according to Embodiment 6 has incidence region 651 on which light emitted from light emitting element 130 is incident, and emission region 654 that is located on the opposite side to incidence region 651 and that emits light that is incident from incidence region 651. Incidence region 651 includes refraction portion 652 that is located at a central portion of incidence region 651, and Fresnel lens portion 653 that is located on the outer side of refraction portion 652.

Refraction portion 652 is formed so as to intersect with central axis CA2 of second light flux controlling member 650 at a position facing light emitting element 130. Refraction portion 652 is, for example, a flat, spherical, aspheric, or refractive Fresnel lens. Refraction portion 652 has a function that causes part of the light emitted from light emitting element 130 (mainly light emitted in the forward direction) to be incident inside second light flux controlling member 650, and also refracts the incident light toward emission region 654. The shape of refraction portion 652 in the present embodiment is rotationally symmetrical about central axis CA2 of second light flux controlling member 650.

Fresnel lens portion 653 causes part of the light emitted from light emitting element 130 (mainly light emitted in the lateral direction) to be incident inside second light flux controlling member 650, and also totally reflects the incident light toward emission region 654. The shape of Fresnel lens portion 653 is rotationally symmetrical about central axis CA2 of second light flux controlling member 650, and Fresnel lens portion 653 has a plurality of toric protrusions that are arranged in a concentric shape (see FIG. 17C). As shown in FIG. 17D, among the plurality of toric protrusions, a protrusion located on the outermost side is formed to be larger than the other protrusions.

Each of the plurality of protrusions has a first inclining surface that is an incidence surface on which light emitted from light emitting element 130 is incident, and a second inclining surface that is a reflection surface that reflects light that is incident from the first inclining surface toward emission region 654. In each protrusion, the first inclining surface is located on the inner side (central axis CA2 side) and the second inclining surface is located on the outer side.

A generating line of the first inclining surface may be a straight line or may be a curve. An angle of the first inclining surface with respect to optical axis LA of light emitting element 130 is not particularly limited as long as light that is incident from the first inclining surface can be refracted to the side of the second inclining surface, and the angle can be appropriately set in accordance with the size and location of light emitting element 130. The angles of the first inclining surfaces of the respective protrusions may be identical or may be different. Likewise, a generating line of the second inclining surface may be a straight line or may be a curve. An angle of the second inclining surface with respect to optical axis LA of light emitting element 130 is not particularly limited as long as light that is incident from the first inclining surface can be reflected to the side of emission region 654, and the angle can be appropriately set in accordance with the intended light distribution characteristics and the like. The angles of the second inclining surfaces of the respective protrusions may be identical or may be different.

Emission region 654 is a flat surface that is formed on the first light flux controlling member 140 side that is on the opposite side to light emitting element 130. Emission region 654 is formed so as to intersect with central axis CA2 of second light flux controlling member 650. As shown in FIG. 17A, emission region 654 is a rotationally symmetric plane about central axis CA2 of second light flux controlling member 650. Emission region 654 causes light that is incident from refraction portion 652, and light that is incident from first inclining surface of Fresnel lens portion 653 and reflected by second inclining surface to be emitted toward first light flux controlling member 140.

Holder 660 included in the light flux controlling member according to Embodiment 6 has fundamentally the same structure as holder 160 included in light flux controlling member 170 according to Embodiment 1. However, holder 660 differs from holder 160 in the respect that the wall thickness thereof is thinned within a range that can secure the light intensity and prevent the occurrence of light leakage. As shown in FIG. 17D, the wall thickness of holder 660 differs depending on the location (the same as holder 360 according to Embodiment 3). Further, positioning bosses 661 and positioning hooks 662 for positioning holder 660 on substrate 120 are provided at the lower end of holder 660.

Figure 18A:
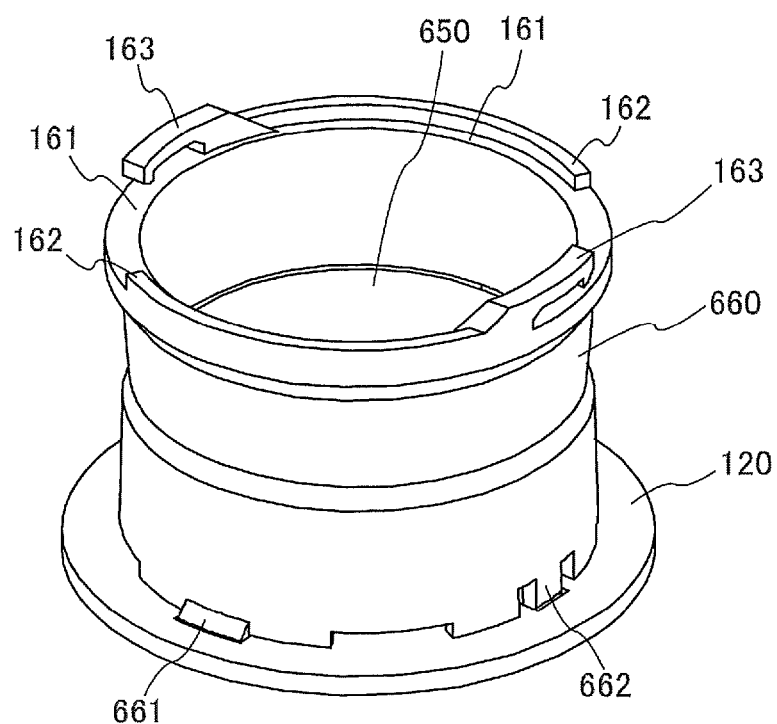
FIGS. 18A and 18B are perspective views illustrating a state in which the holder is fixed on a substrate.
Figure 18B:
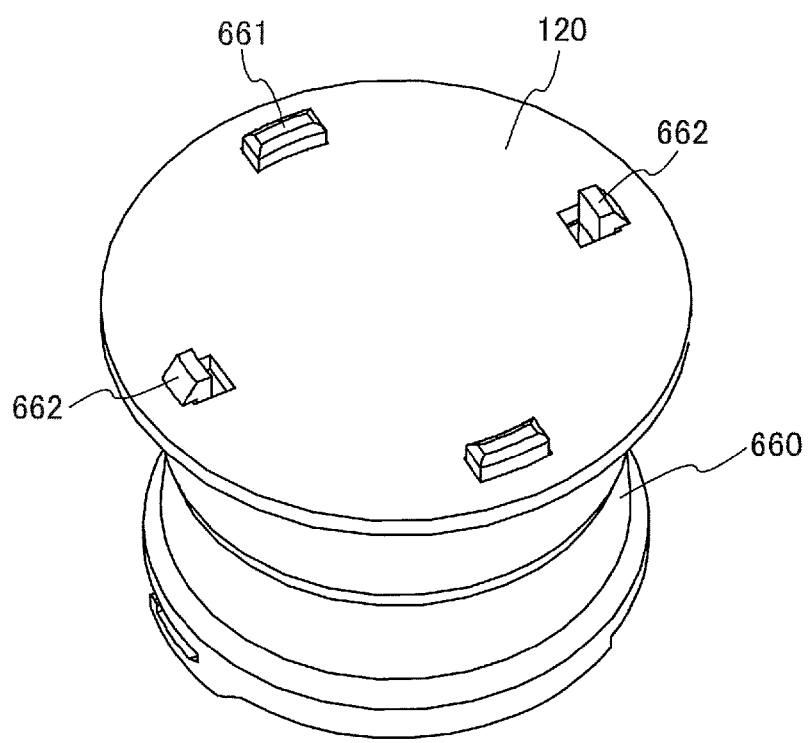

FIGS. 18A and 18B illustrate a state in which holder 660 is fixed on substrate 120. FIG. 18A is a perspective view as seen from the side of holder 660. FIG. 18B is a perspective view as seen from the side of substrate 120. As shown in these drawings, four through-holes are provided in substrate 120. Holder 660 is fixed on substrate 120 by inserting positioning bosses 661 and positioning hooks 662 of holder 660 in the four through-holes, respectively. At such time, adhesive may be used or need not be used.

Positioning bosses 661 are fitted into the corresponding through-holes in a state in which almost no gap exists between each positioning boss 661 and the corresponding through-hole. On the other hand, positioning hooks 662 are fitted into the corresponding through-holes so that the tips thereof engage with the rear surface of substrate 120. Positioning bosses 661 can prevent movement in a direction parallel to the substrate surface. Positioning hooks 662 can prevent movement in a direction perpendicular to the substrate surface.

[Advantageous Effects]

The light flux controlling member according to Embodiment 6 has the same advantageous effects as light flux controlling member 170 according to Embodiment 1, while also being lighter than light flux controlling member 170 according to Embodiment 1. Further, the light flux controlling member according to Embodiment 6 can be easily fixed on substrate 120.

Modified Example

Although an example in which the second light flux controlling member and the holder are integrated was described in Embodiments 1 to 4 and Embodiment 6, a configuration may also be adopted in which the second light flux controlling member and the holder are separate members. In such case, it is necessary to fix the second light flux controlling member to the holder before fixing the first light flux controlling member to the holder. A method for fixing the second light flux controlling member to the holder is not particularly limited. For example, a stepped portion may be formed in the circumferential direction at the inner peripheral surface of the holder, and the second light flux controlling member may be fixed using the stepped portion.

Figure 1:
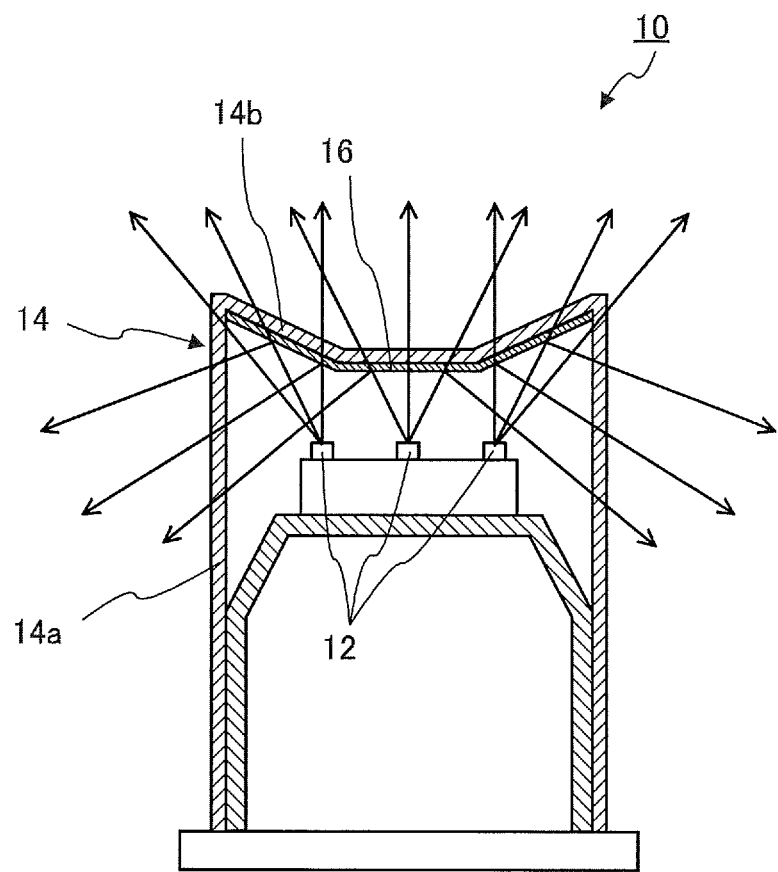
FIG. 1 is a cross-sectional view of an illumination apparatus described in PTL 1.

Further, although a light flux controlling member having a first light flux controlling member formed in a predetermined shape was described in Embodiments 1 to 6, the shape of the first light flux controlling member is not particularly limited. For example, the shape of the first light flux controlling member may be an inverted circular truncated cone shape, similarly to case 14 that is described in PTL 1 (see FIG. 1).

The present application claims priority based on Japanese Patent Application No. 2012-026971 filed on Feb. 10, 2012 and Japanese Patent Application No. 2012-190014 filed on Aug. 30, 2012. The entire contents of the specification and drawings of the aforementioned documents are hereby incorporated by reference into the specification of the present application.

INDUSTRIAL APPLICABILITY

The illumination apparatus according to the present invention can be used as an alternative to an incandescent light bulb, and thus can be widely applied to various illumination devices such as a chandelier or an indirect illumination apparatus.

REFERENCE SIGNS LIST

10 Illumination apparatus
12 LED

14 Case
14a Case body
14b Cover section
16 Transflective film
18 Hook
20 Notch portion
100 Illumination apparatus
110 Base
120 Substrate
130 Light emitting element
140 First light flux controlling member
141 Reflection surface
142 Flange
143 Fitting portion
144 Recess
150, 650 Second light flux controlling member
151 Incidence surface
152 Total reflection surface
153 Emission surface
160, 260, 360, 460, 560, 660 Holder
161 End face
162 Guide protrusion
163 Hook
165 Stepped portion
166 Ventilation opening
170 Light flux controlling member
180 Cover
461 Ventilation groove
651 Incidence region
652 Refraction portion
653 Fresnel lens portion
654 Emission region
661 Positioning boss
662 Positioning hook
CA1 Central axis of first light flux controlling member
CA2 Central axis of second light flux controlling member
LA Optical axis of light emitting element

The invention claimed is:

1. A light flux controlling member that controls a light distribution of light emitted from a light emitting element, comprising:
   a substantially cylindrically shaped holder having optical transparency; and
   a first light flux controlling member disposed on one end face of the holder, the first light flux controlling member reflecting part of the light emitted from the light emitting element and transmitting part of the light emitted from the light emitting element,
   wherein:
   the first light flux controlling member includes two principal surfaces that are in a front-and-rear relationship;
   a guide protrusion is provided at one part of an outer peripheral portion of the one end face of the holder;
   one or more hooks are provided on the one end face of the holder;
   a fitting portion that is located between the hook and the one end face when the first light flux controlling member is mounted on the one end face of the holder is provided at an outer peripheral portion of the first light flux controlling member;
   movement of the first light flux controlling member in a radial direction is restricted by allowing the first light flux controlling member to be radially fitted so as to be rotatable along the guide protrusion;
   the first light flux controlling member is fixed on the one end face of the holder by rotating the first light flux controlling member on the one end face of the holder to engage the fitting portion between the hook and the one end face; and
   a ventilation groove is provided on the one end face of the holder and an inner face of the guide protrusion, the ventilation groove bending in a crank shape.

2. The light flux controlling member according to claim 1, wherein, when seen in a plan view, the outer peripheral portion of the first light flux controlling member overlaps with the one end face of the holder over an entire circumference thereof.

3. The light flux controlling member according to claim 1, wherein, of the light emitted from the light emitting element, at least light that is emitted within an angular range from a direction in which light of a maximum intensity is emitted to a direction in which light of an intensity that is a half of the maximum intensity is emitted passes through at least one of the holder and the first light flux controlling member and is emitted to an outer region from an inner region that is surrounded by the holder and the first light flux controlling member.

4. The light flux controlling member according to claim 1, further comprising a second light flux controlling member on which at least part of the light emitted from the light emitting element is incident, and that controls the incident light to have predetermined light distribution characteristics and emits the controlled light toward the first light flux controlling member,
   wherein:
   the second light flux controlling member includes an incidence surface on which at least part of the light emitted from the light emitting element is incident, a total reflection surface that reflects part of the light that is incident on the incidence surface toward the first light flux controlling member, and an emission surface that emits part of the light that is incident on the incidence surface and the light that is reflected at the total reflection surface; and
   the first light flux controlling member reflects part of the light emitted from the second light flux controlling member and transmits part of the light emitted from the second light flux controlling member.

5. The light flux controlling member according to claim 1, wherein:
   the first light flux controlling member includes a reflection surface that faces the light emitting element and reflects part of the light emitted from the light emitting element;
   the reflection surface is a rotationally symmetric plane with an optical axis of the light emitting element as a rotation axis, and is formed so that a generating line of the rotationally symmetric plane is a curve that is concave with respect to the light emitting element; and
   an outer peripheral portion of the reflection surface is formed at a position that is farther from the light emitting element in a direction of the optical axis of the light emitting element than a position of a central portion of the reflection surface.

6. The light flux controlling member according to claim 1, further comprising a second light flux controlling member on which at least part of the light emitted from the light emitting element is incident, and that controls the incident light to have predetermined light distribution characteristics and emits the controlled light toward the first light flux controlling member, wherein:
the second light flux controlling member includes an incidence surface on which at least part of the light emitted from the light emitting element is incident, a total reflection surface that reflects part of the light that is incident on the incidence surface toward the first light flux controlling member, and an emission surface that emits part of the light that is incident on the incidence surface and the light that is reflected at the total reflection surface;
the first light flux controlling member includes a reflection surface that faces the second light flux controlling member and reflects part of the light emitted from the second light flux controlling member;
the reflection surface is a rotationally symmetric plane with an optical axis of the light emitting element as a rotation axis, and is formed so that a generating line of the rotationally symmetric plane is a curve that is concave with respect to the light emitting element; and
an outer peripheral portion of the reflection surface is formed at a position that is farther from the light emitting element in a direction of the optical axis of the light emitting element than a position of a central portion of the reflection surface.

7. The light flux controlling member according to claim 1, further comprising a second light flux controlling member on which at least part of the light emitted from the light emitting element is incident, and that controls the incident light to have predetermined light distribution characteristics and emits the controlled light toward the first light flux controlling member,
wherein:
the second light flux controlling member includes an incidence region on which at least part of the light emitted from the light emitting element is incident, and an emission region that emits the light that is incident on the incidence region;
the incidence region includes a Fresnel lens portion having a plurality of toric protrusions that are arranged in a concentric shape and that have first inclining surfaces on which part of the light emitted from the light emitting element is incident and second inclining surfaces that reflect the light that is incident on the first inclining surface towards the emission region;
the first light flux controlling member includes a reflection surface that faces the second light flux controlling member and reflects part of the light emitted from the second light flux controlling member; and
the reflection surface is a rotationally symmetric plane with an optical axis of the light emitting element as a rotation axis, and is formed so that a generating line of the rotationally symmetric plane is a curve that is concave with respect to the light emitting element.

8. The light flux controlling member according to claim 5, wherein a transflective film that reflects part of the light emitted from the light emitting element and transmits part of the light emitted from the light emitting element is formed on the reflection surface.

9. The light flux controlling member according to claim 5, wherein the first light flux controlling member is formed of a material that reflects part of light that reaches the first light flux controlling member, and transmits part thereof.

10. The light flux controlling member according to claim 5, wherein the first light flux controlling member includes a transmission portion that transmits part of light that reaches the first light flux controlling member.

11. The light flux controlling member according to claim 10, wherein the transmission portion is a through-hole or a recess.

12. An illumination apparatus comprising:
one or more light emitting elements;
a light flux controlling member according to claim 1; and
a cover that transmits reflected light and transmitted light from the light flux controlling member while diffusing the reflected light and the transmitted light.

13. The light flux controlling member according to claim 6, wherein a transflective film that reflects part of the light emitted from the light emitting element and transmits part of the light emitted from the light emitting element is formed on the reflection surface.

14. The light flux controlling member according to claim 7, wherein a transflective film that reflects part of the light emitted from the light emitting element and transmits part of the light emitted from the light emitting element is formed on the reflection surface.

15. The light flux controlling member according to claim 6, wherein the first light flux controlling member is formed of a material that reflects part of light that reaches the first light flux controlling member, and transmits part thereof.

16. The light flux controlling member according to claim 7, wherein the first light flux controlling member is formed of a material that reflects part of light that reaches the first light flux controlling member, and transmits part thereof.

17. The light flux controlling member according to claim 6, wherein the first light flux controlling member includes a transmission portion that transmits part of light that reaches the first light flux controlling member.

18. The light flux controlling member according to claim 7, wherein the first light flux controlling member includes a transmission portion that transmits part of light that reaches the first light flux controlling member.

19. The light flux controlling member according to claim 17, wherein the transmission portion is a through-hole or a recess.

20. The light flux controlling member according to claim 18, wherein the transmission portion is a through-hole or a recess.

* * * * *